US008620131B2

(12) United States Patent
Suh

(10) Patent No.: US 8,620,131 B2
(45) Date of Patent: Dec. 31, 2013

(54) VARIABLE OPTICAL ATTENUATOR (VOA)

(75) Inventor: Seong Woo Suh, Budd Lake, NJ (US)

(73) Assignee: INLC Technology, Inc., Gwangju (KR)

( * ) Notice: Subject to any disclaimer, the term of this patent is extended or adjusted under 35 U.S.C. 154(b) by 38 days.

(21) Appl. No.: 13/250,180

(22) Filed: Sep. 30, 2011

(65) Prior Publication Data

US 2012/0081625 A1    Apr. 5, 2012

Related U.S. Application Data

(60) Provisional application No. 61/388,062, filed on Sep. 30, 2010.

(51) Int. Cl.
*G02B 6/00*        (2006.01)
(52) U.S. Cl.
USPC ............... 385/140; 349/33; 349/34; 349/113; 349/117; 349/119; 385/11; 385/15; 385/31; 385/33
(58) Field of Classification Search
USPC ............ 385/11, 140, 31, 33, 15; 349/201, 33, 349/34, 113, 117, 119, 120, 193
See application file for complete search history.

(56) References Cited

U.S. PATENT DOCUMENTS

| | | | |
|---|---|---|---|
| 6,330,097 B1 * | 12/2001 | Chen et al. | 359/239 |
| 6,404,538 B1 * | 6/2002 | Chen et al. | 359/323 |
| 6,606,181 B2 * | 8/2003 | Patel et al. | 359/238 |
| 7,034,979 B1 | 4/2006 | Feng et al. | |
| 2002/0080462 A1 * | 6/2002 | Patel et al. | 359/256 |
| 2006/0227283 A1 * | 10/2006 | Ooi et al. | 349/201 |
| 2012/0081625 A1 * | 4/2012 | Suh | 349/33 |

* cited by examiner

*Primary Examiner* — Jennifer Doan
(74) *Attorney, Agent, or Firm* — Stein IP, LLC

(57) ABSTRACT

A variable optical attenuator includes a collimating unit that collimates an incident light beam, a polarization splitting member that separates the collimated light beam into a first polarized light beam having a first polarization and a second polarized light beam having a second polarization, a birefringence control unit through which the first and second polarized light beams pass, the birefringence control unit including a liquid crystal cell having a birefringence is controlled by a voltage or current, wherein the birefringence of the liquid crystal cell is substantially zero when no voltage or current is applied thereto, and a reflection member that reflects the first and second polarized light beams output from the birefringence control unit. The variable optical attenuator has high stability, high precision, and low volume.

18 Claims, 3 Drawing Sheets

VARIABLE OPTICAL ATTENUATOR (VOA)

CROSS-REFERENCE TO RELATED APPLICATION

This application claims the benefit of U.S. Provisional Application No. 61/388,062, filed Sep. 30, 2010, in the United States Patent & Trademark Office, the disclosure of which is incorporated herein by reference.

BACKGROUND

1. Field

The present subject matter relates generally to the field of optical attenuation devices for use in optical systems, particularly to a variable optical attenuator that requires little space and high stability.

2. Description of the Related Art

Fiber optics is increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on a copper conductor.

Many conventional electrical networks are being upgraded to optical networks to take advantage of the increased speed and efficiency. Optical communication networks use lasers to create light which is then modulated to convey information. One of the many components of an optical communications network is an optical attenuator. Optical attenuators control the intensity of one or more wavelengths of light within an optical system. To transmit and receive optical light properly without incurring defects or errors, the light intensity needs to be regulated properly. Too much power on the receiver side will saturate the receiver and too little power will result in poor transmission quality. Modern optical networks often use of multiple wavelengths in conjunction with broadband optical amplifiers such as erbium doped fiber amplifies (EDFA), which require proper balancing of the intensity of each wavelengths used in the networks. On occasion, it is necessary to recalibrate or replace one or more of the lasers generating light in the system. To avoid data corruption, it is preferred to completely extinguish the laser's light from the optical system before recalibration or replacement. Optical attenuators are capable of extinguishing the laser's light by blocking it from entering the remainder of the optical system. There are numerous general methods of attenuating or completely extinguishing light including polarization, reflection, diffusion, etc. In addition, it is often necessary to control the intensity of a particular wavelength or channel of light entering a fiber. Although it is possible to simply adjust the electrical current feeding a laser to adjust the output intensity, this is not desirable because this method of attenuation will affect the bandwidth capabilities of the laser. Therefore, it is preferred to use a variable optical attenuator to attenuate or adjust the output intensity of a particular laser.

A variable optical attenuator using crystal wedges is disclosed in U.S. Pat. No. 7,034,979 to Feng et al. (hereinafter, "Feng et al."). Feng et al. uses crystal wedge as a birefringent element, and one or two polarization modulators between the birefringent element and a reflective element. In Feng et al., the crystal wedge splits an incident beam into two different components depending on their polarizations and refracts them to the one or two polarization modulators. The polarization modulators can be liquid crystal (LC) modules. More specifically, according to Feng et al., in case using a single LC module, as shown in FIG. 1A, the single LC module must convert one polarization of the light to another polarization orthogonal thereto by using LC materials and the structure exhibiting retardation close to quarter-wave plate such as a homogeneously aligned LC module, in which the LC director and optical axis are aligned parallel to the glass plate, because it should be a default-on mode, i.e., normally white mode. In this case, the black or extinction state need to be achieved by reducing birefringence while applying electric field. However, according to the device disclosed in Feng et al., it is very difficult to achieve high extinction due to residual birefringence left in LC module. The dark state transmission of this structure is also dependent on the wavelength of the light due to the residual birefringence. To compensate this shortcoming, Feng et al. has to provide a compensation element on the incident side of the LC module. Moreover, using two LC modules to realize a default-off mode, as shown in FIG. 1B of Feng et al., requires two LC modules with substantially the same thickness to remove all residual birefringence or resulting polarization rotation. It is very cumbersome and quite difficult to match the two cells in exact thickness in practical production. It also makes the overall device size big, which may result in technical disadvantages.

Therefore, there is a need in the industry for a variable optical attenuator that exhibits high extinction with very low wavelength dependence, precise control of incoming light in a compact package. In addition, the optical attenuator is preferably capable of being incorporated into an optical transceiver package.

SUMMARY

In accordance with the present subject matter, a variable optical attenuator with high extinction, low wavelength dependency, high stability, high precision, and small size can be achieved.

An aspect of the present subject matter is directed to a variable optical attenuator comprising: a collimating unit that collimates an incident light beam; a polarization splitting member that separates the collimated light beam into a first polarized light beam having a first polarization and a second polarized light beam having a second polarization; a birefringence control unit through which the first and second polarized light beams pass, the birefringence control unit including a liquid crystal cell having a birefringence is controlled by a voltage or current, wherein the birefringence of the liquid crystal cell is substantially zero when no voltage or current is applied thereto; and a reflection member that reflects the first and second polarized light beams output from the birefringence control unit.

In the variable optical attenuator according to an aspect of the present subject matter, the liquid crystal cell may include homeotropic liquid crystal. In this structure, the director and optical axis of the liquid crystal are aligned substantially vertical to the substrate.

In the variable optical attenuator according to an aspect of the present subject matter, the liquid crystal cell may be an In-Plane Switching (IPS) mode liquid crystal cell. In this case, the director and optical axis of the liquid crystal is aligned parallel to the substrate while the polarization of the incident light is either parallel or orthogonal to the liquid crystal optical axis, whereby the liquid crystal does not alter the polarization of the incident beam in a non-activated state.

In the variable optical attenuator according to an aspect of the present subject matter, the liquid crystal cell may be a Blue Phase mode liquid crystal cell. The Blue phase mode liquid crystal intrinsically exhibits no birefringence when it is not activated by electrical field. However, the birefringence can be induced by applying electrical voltage or current. The direction of electric field needs to be approximately perpendicular to the incoming direction of the light to modify the polarization of the incoming light. If the incoming beam is perpendicular to the substrate of the liquid crystal module, the electric field needs to be parallel to the substrate plane, thus is called in-plane switching.

In the variable optical attenuator according to an aspect of the present subject matter, the polarization splitting member may include a square type birefringent crystal, wedge type birefringent crystal. Wollaston prisms, and/or Brewster windows.

In the variable optical attenuator according to an aspect of the present subject matter, the collimating unit may include an optical input channel, an optical output channel, and an optical lens.

In the variable optical attenuator according to an aspect of the present subject matter, the birefringence control unit may include two substrates substantially parallel to each other and the homeotropic liquid crystal is provided between the two substrates, molecules of the homeotropic liquid crystal being oriented substantially orthogonal to at least one surface of the substrates that contacts with the liquid crystal under no external voltage or current applied thereto, whereby the first and second polarized light beams experience no substantial change of polarization when they pass through the birefringence control unit. It should be noted that a small angle of tilt such as less than 1 or 2 degrees from orthogonal to the substrate can be introduced by properly treating (e.g. rubbing) the surfaces of the substrates to achieve a stable structure and tilt while applying electric field. This will reduce the extinction of the device but the amount is usually very small. The liquid crystal substrate can be also tilted with a small angle to reduce unwanted reflection from the substrate or interference from it. To maintain high extinction of the device, the tilt angle from both the liquid crystal and the substrate can be made parallel or orthogonal to the incoming polarization.

In the variable optical attenuator according to an aspect of the present subject matter, when the voltage or current is nonzero, the molecules of the homeotropic liquid crystal may be tilted with respect to their orientation when no voltage or current is applied thereto, thereby changing the polarizations of the first and second polarized light beams.

In the variable optical attenuator according to an aspect of the present subject matter, the birefringence control unit may be configured to function as a quarter-wave plate when the voltage or current reaches a predetermined value.

Another aspect of the present subject matter is directed to a method of processing an optical signal, comprising: collimating an incident light beam using a collimator; separating the collimated light beam into a first polarized light beam having a first polarization and a second polarized light beam having a second polarization using a polarization splitter; controlling a birefringence of a liquid crystal cell in a birefringence control unit by applying a voltage or current such that the birefringence of the liquid crystal is substantially zero when no external voltage or current is applied to the liquid crystal cell and is nonzero when the external voltage or current is applied to the liquid crystal cell; and reflecting the first and second polarized light beams output from the birefringence control unit to the birefringence control unit.

In the method according to an aspect of the present subject matter, the liquid crystal cell may include homeotropic liquid crystal.

In the method according to an aspect of the present subject matter, the liquid crystal cell may be an In-Plane Switching (IPS) mode liquid crystal cell.

In the method according to an aspect of the present subject matter, the liquid crystal cell may be a Blue Phase mode liquid crystal cell.

In the method according to an aspect of the present subject matter, the polarization splitting member may include a square type birefringent crystal, wedge type birefringent crystal, Wollaston prisms, and/or Brewster windows.

In the method according to an aspect of the present subject matter, the collimating unit may include an optical input channel, an optical output channel, and an optical lens.

In the method according to an aspect of the present subject matter, the birefringence control unit may include two plates substantially parallel to each other and the homeotropic liquid crystal is provided between the two substrates, molecules of the homeotropic liquid crystal being oriented substantially orthogonal to at least one surface of the substrates that contacts with the liquid crystal under no external voltage or current applied thereto, whereby the first and second polarized light beams experience no substantial change of polarization when they pass through the birefringence control unit.

In the method according to an aspect of the present subject matter, when the external voltage or current from the external voltage/current source is nonzero, the molecules of the homeotropic liquid crystal may be tilted with respect to their orientation under no external voltage or current applied thereto, thereby changing the polarizations of the first and second polarized light beams.

In the method according to an aspect of the present subject matter, the birefringence control unit may be configured to function as a quarter-wave plate when the external voltage or current from the external voltage/current source reaches a predetermined value.

Additional aspects and/or advantages of the present subject matter will be set forth in part in the description which follows and, in part, will be obvious from the description, or may be learned by practice of the present subject matter.

BRIEF DESCRIPTION OF THE DRAWINGS

These and/or other aspects and advantages of the present subject matter will become apparent and more readily appreciated from the following description of the embodiments, taken in conjunction with the accompanying drawings of which.

DETAILED DESCRIPTION

Figure 1:
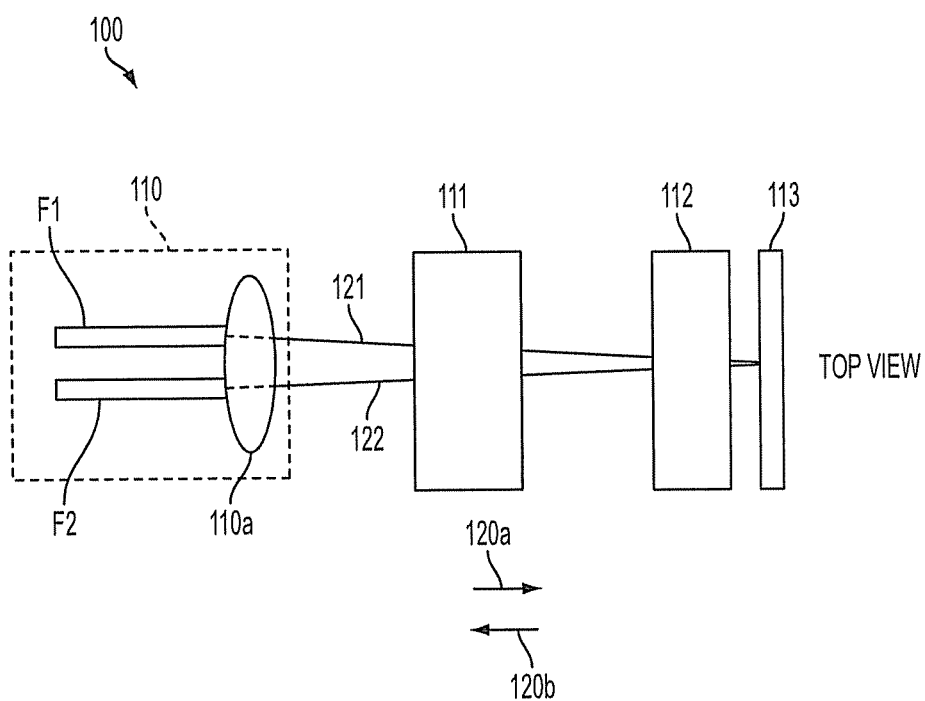
FIG. 1 is a top view of a variable optical attenuator in accordance with an embodiment of the present subject matter.

Reference will now be made in detail to embodiments of the present subject matter, examples of which are illustrated in the accompanying drawings, wherein like reference numerals refer to the like elements throughout. The embodiments are described below in order to explain the present subject matter by referring to the figures.

A variable optical attenuator (VOA) is a device that adjusts optical power ratio between an input light beam and an output light beam over various ranges of the ratio. The VOA is used to attenuate light beams in optical systems such as fiber optic communication systems.

Figure 2A:
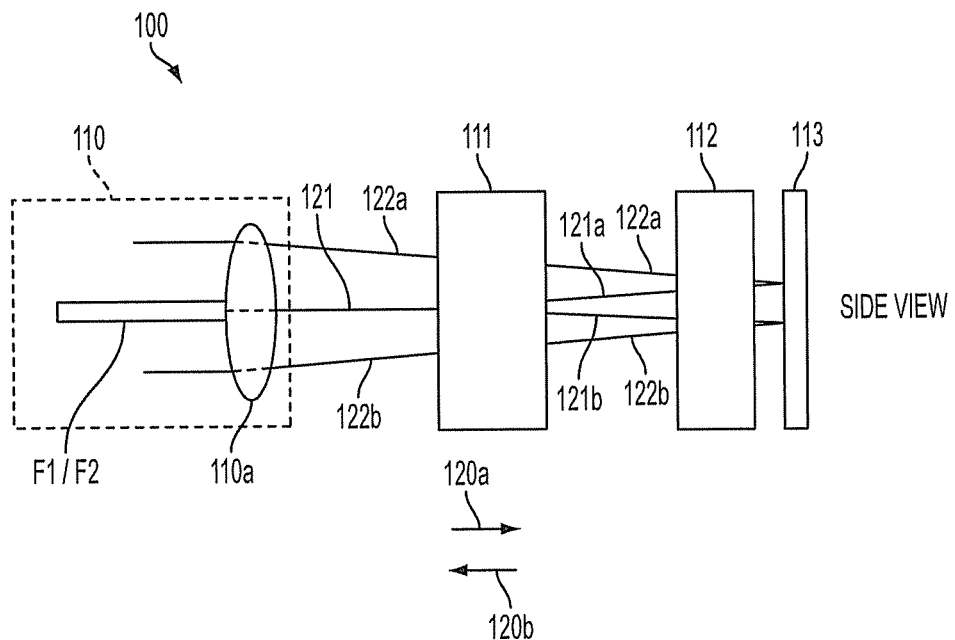
FIGS. 2A and 2B are side views of the variable optical attenuator of FIG. 1.
Figure 2B:
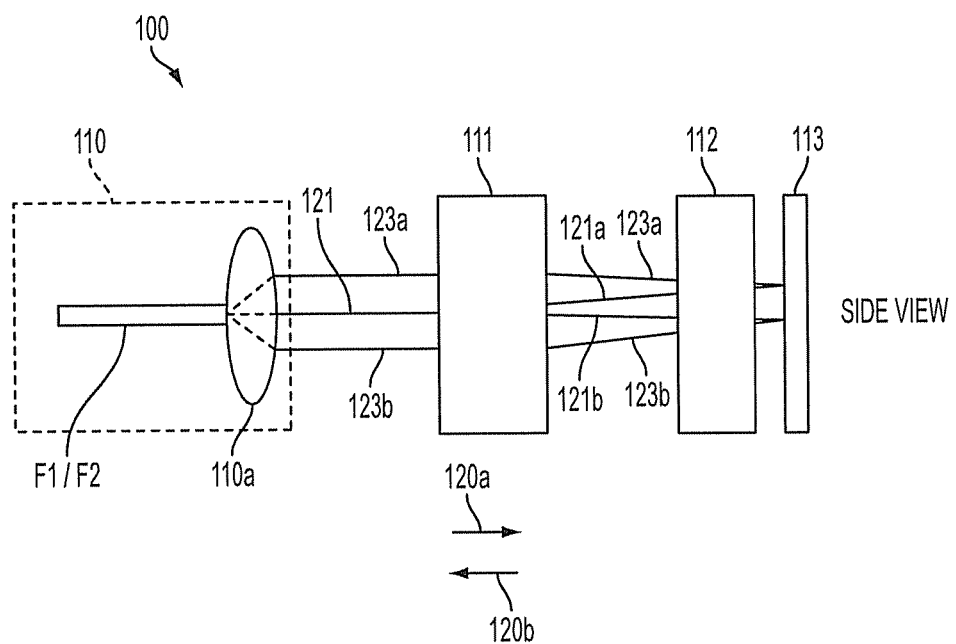

FIG. 1 is a top view of a variable optical attenuator (VOA) 100 according to an embodiment of the present subject matter. FIGS. 2A and 2B are side views of the VOA 100. The operation principles of the VOA 100 of the present subject matter will be described referring to FIGS. 2A and 2B.

Referring to FIG. 1, the VOA 100 includes a collimating member 110, a polarization splitting member 111, a birefringence control member 112, and a reflection member 113. Here, the collimating member 110 includes an input fiber F1, an output fiber F2, and a lens 110a. The shown type of collimator 110 having a lens 110a coupled with two optic fibers F1, F2 is generally referred to as a dual fiber collimator. The optic fibers F1 and F2 coupled with the lens 110a can be used for an input and output ports of the VOA 100, respectively, although the invention is not limited thereto.

An input light 121 is transmitted through the input fiber F1, and the lens 110a directs the input light 121 to the polarization splitting member 111. The input light 121 further travels along a first direction 120a through the birefringence control member 112, and is reflected at the reflection member 113. The reflected light 122 travels backwards along a second direction 120b through the birefringence control member 112 and the polarization splitting member 111, and enters into the collimating member 110.

When the lens 110a directs the input light 121 at a certain angle with respect to the axis thereof, the path of the reflected light 122, which is reflected from the reflection member 113, is displaced from the path of the input light 121. Once the reflected light 122 is transmitted to the lens 110a of the collimating member 110, the lens 110a directs the reflected light 122 into the output fiber F2.

The polarization splitting member 111 is an element that splits incident light into two polarization components, which can be orthogonal to each other, for example. The split beams having different polarization components are deviated from each other during passing through the polarization splitting member 111. In other words, the input light 121 is split into a first polarized light beam having a first polarization and a second polarized light beam having a second polarization by the polarization splitting member 111, wherein the first polarized light beam travels in a different direction or a different position from the second polarized light beam. This split of polarization is illustrated in FIGS. 2A and 2B, which are side views of the VOA 100. In FIGS. 2A and 2B, the input light 121 is split into a first polarized light beam 121a and a second polarized light beam 121b. The first polarized light beam 121a is deflected upwards while the second polarized light beam 121b downwards. This separation between the first and second light beams 212a, 212b is not identified from FIG. 1, which is a top view of the VOA 100, because the paths of the two 121a, 121b are seen as overlapping with each other. The first and second polarizations can be orthogonal to each other, although the invention is not limited thereto.

Examples of the polarization splitting member 111 may include a square or wedge type birefringent crystal, Wollaston prisms, and Brewster windows. However, any element, which is capable of splitting a light beam into two polarization components, can be used for the polarization splitting member 111.

The birefringence control member 112 is an element that is capable of changing birefringence by an external parameter, such as an external voltage or current applied to the birefringence control member 112. The birefringence control member 112 may be, but not limited to, a liquid crystal (LC) cell having a pixel or a plurality of pixels.

The reflection member 113 is an element that is capable of reflecting light. Examples of the reflection member 113 may include, but not limited to, a mirror and a reflection layer. If the LC cell is used for the birefringence control member 112, the reflection member 113 can be disposed external to the LC cell or can be integrated into the LC cell. If the reflection member 113 is integrated into the LC cell, the LC cell is a reflective type LC cell and a separate external reflection member may not be required.

The birefringence control member 112 is illustrated in FIG. 1 as a transmission type for the purpose of description. In this case, the reflection member 113 is disposed outside the birefringence control member 112. Therefore, a light transmitted through the birefringence control member 112 along the first direction 120a is reflected at the reflection member 113.

Typically, the LC cell has two substrates; first and second substrates. The first and second substrates face each other. A liquid crystal material is disposed between the two substrates. In case a reflection layer is integrated into the LC cell, the reflection layer can be placed in an inner or outer surface of a substrate of the liquid crystal cell. Herein, the inner surfaces of the substrates are defined as surfaces that face each other, and the outer surfaces of the substrates are defined as opposite surfaces of the inner surfaces of the substrates. In the case that the reflection layer is integrated into the LC cell, light beams are transmitted through the first substrate of the LC cell and the liquid crystal material, and then are reflected from the reflection layer, which is placed in the inner or outer surface of the second substrate of the LC cell.

Additionally, the LC cell can include electrode layers formed on inner surfaces of the two substrates, and alignment layers formed on the electrode layers. A voltage to drive the LC cell is applied to the electrode layers, and the alignment layers make LC molecules be aligned in a predetermined direction.

The LC cell in the birefringence control member 112 can be a homogeneously aligned nematic LC cell or homeotropically aligned LC cell. In the homogeneously aligned nematic LC cell, nematic liquid crystals are oriented parallel to the substrates in the absence of voltage, while in the homeotropic LC cell, nematic liquid crystals are oriented perpendicular to the substrates in the absence of voltage. If an external voltage is applied to the liquid crystals, the orientation of liquid crystals changes. For example, the homogeneously aligned nematic liquid crystals can be aligned perpendicular to the substrate in the presence of the external voltage, while the homeotropically aligned nematic liquid crystals can be aligned parallel to the substrates in the presence of the external voltage. Since the liquid crystals are birefringent material, if the orientation of the liquid crystals changes, the degree of birefringence of the LC cell accordingly changes.

FIGS. 2A and 2B are side views of the VOA 100 according to the present subject matter. The operation of the VOA 100 will be described referring to FIGS. 2A and 2B. In the side views, the input fiber F1 and the output fiber F2 are substantially at the same level, and are referred to as F1/F2 in FIGS. 2A and 2B. The paths of light beams shown in FIGS. 2A and 2B are exaggerated to clearly explain the principles of the operation of the VOA 100.

FIG. 2A shows that a first voltage is applied to the birefringence control member 112. The birefringence control member 112 has a first birefringence, if a first voltage is applied to the birefringence control member 112. As explained above, the input light beam 121, while passing through the polarization splitting member 111, is split into the first polarized light beam 121a having the first polarization and the second polarized light beam 121b having the second polarization. The first and second polarizations can be orthogonal to each other. The first and second polarized light beams 121a, 121b travel into the birefringence control member 112, and are reflected at the reflection member 113.

In the case that the birefringence control member 112 has the first birefringence, the reflected light beam 122a, 122b maintains the same polarization as the input light beam. If a homeotropic LC cell is used in the birefringence control member 112, the first birefringence can be realized by applying no voltage to the homeotropic LC cell. In other words, the first voltage can be 0V.

When the birefringence control member 112 has the first birefringence, the polarization of the first reflected polarized light beam 122a, after passing through the birefringence control member 112 along the second direction 120b, is the same as the polarization of the first polarized light beam 121a, and the polarization of the second reflected polarized light beam 122b is the same as the polarization of the second polarized light beam 12 1b. The first and second reflected light beams 122a, 122b, while passing though the polarization splitting member 111, further deviate from the first and second polarized light beams 121a, 122a. Accordingly, when the first and second reflected light beams 122a, 122b reach the collimating member 110, the lens 110a in the collimating member 110 cannot couple the first and second reflected polarized light beams 122a, 122b into the output fiber F2, and therefore, no optical power is obtained in the output fiber F2.

FIG. 2B shows that a second voltage is applied to the birefringence control member 112. The birefringence control member 112 has a second birefringence, if the second voltage is applied to the birefringence control member 112. If a homeotropic LC cell is used in the birefringence control member 112, the second birefringence can be a quarter-wave condition for the input light beams 121. As the birefringence of the homeotropic LC cell changes depending on an applied external voltage, the second voltage is the voltage that sets the homeotropic LC cell to meet the quarter wave condition.

The input light beam 121, while passing through the polarization splitting member 111, are split into a first polarized light beam 121a having a first polarization and a second polarized light beam 121b having a second polarization. The first and second polarizations can be orthogonal to each other. The first and second polarized light beams 121a and 121b travel into the birefringence control member 112, and are reflected at the reflection member 113.

In contrast to the case shown in FIG. 2A, if the birefringence control member 112 has the second birefringence, the reflected light beam has a different polarization from the input light beam. For example, if the second birefringence is set to a quarter wave condition of the wavelength of the input light beams 121, the first reflected polarized light beam 123a has the second polarization, while the first polarized light beam 121a has the first polarization; and the second reflected polarized light beam 123b has the first polarization, while the second polarized light beam 121b has the second polarization.

The first and second reflected light beams 123a, 123b, while passing though the polarization splitting member 111, are refracted in different ways from the case shown in FIG. 2A, because the polarizations of the first and second reflected light beams 123a, 123b in FIG. 2B are different from the polarizations of the first and second reflected light beams 122a, 122b in FIG. 2A. In FIG. 2B, the first and second reflected light beams 123a, 123b are refracted to become substantially parallel to each other, but with a small displacement. When the first and second reflected light beams 123a, 123b reach the collimating member 110, the lens 110a in the collimating member 110, in this case, can completely couple the first and second reflected polarized light beams 123a, 123b into the output fiber F2, and therefore, optical power is obtained at the output fiber F2.

The birefringence of the birefringence control member 112 can be controlled by external parameters, and the magnitude of the power obtained at the output fiber F2 depends on the birefringence of the birefringence control member 112. For example, if the birefringence control member 112 has a third birefringence, which is between the first and second birefringence, the path of the first reflected light beam at the third birefringence is between the paths of first reflected light beams 122a (at the first birefringence) and 123a (at the second birefringence), and the path of the second reflected light beam at the third birefringence is between the paths of second reflected light beams 122b (at the first birefringence) and 123b (at the second birefringence). In this case, the lens 110a in the collimating member 110 can partially couple the first and second reflected polarized light beams (not shown) into the output fiber F2. In this way, various levels of optical power can be obtained at the output fiber F2 by changing the birefringence of the birefringence control member 112.

Figure 3A:
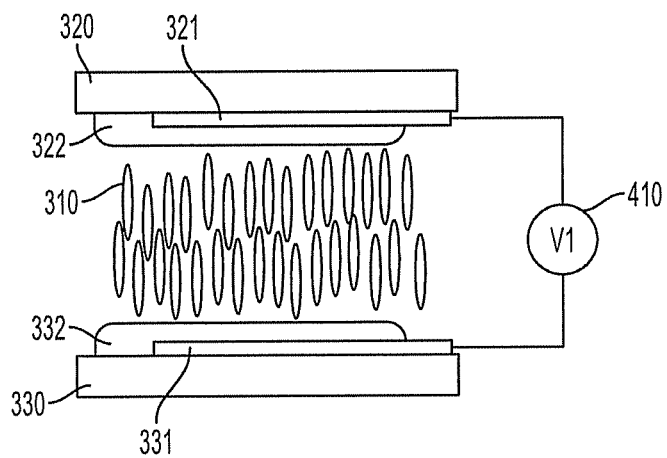
FIGS. 3A and 3B illustrate an exemplary homeotropic liquid crystal cell according to an embodiment of the present subject matter.
Figure 3B:
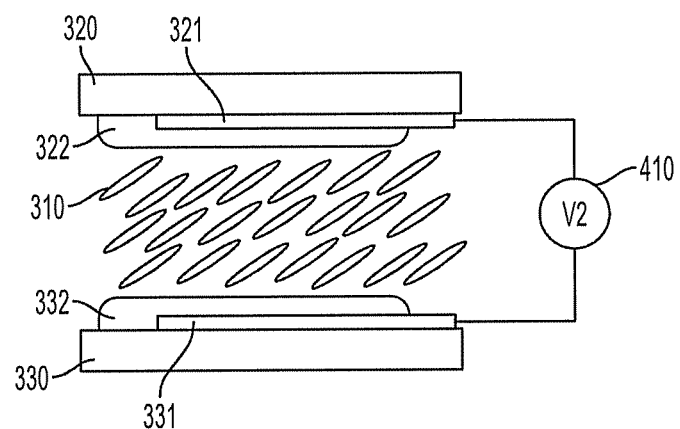

FIGS. 3A and 3B show an exemplary homeotropic liquid crystal (LC) cell, which can be adapted into the birefringence control member 112 of the VOA 100 as shown in FIGS. 1, 2A and 2B.

The homeotropic LC cell includes a first substrate 320 and a second substrate 330. A first electrode layer 321 is formed on an inner surface of the first substrates 320, and a second electrode layer 331 is formed on an inner surface of the second substrate 330. A first alignment layer 322 is formed on the first electrode layer 321, and a second alignment layer 332 is formed on the second electrode layer 331.

The first and second alignment layers 322, 332 are capable of aligning liquid crystals 310 perpendicular to the substrates 320, 330. There are materials known in the art that can be used for the alignment layers 322, 332.

In case the input light beam 121 is supposed to enter to the first substrate 320, the electrode layer 321 is formed of a transparent conductive material, such as indium tin oxide (ITO), Al-doped zinc oxide (AZO) and Zn-doped indium oxide (IZO). Here, the transparent conductive material has transparency at a given wavelength of the input light beam.

If the reflection member 113 is integrated into the homeotropic LC cell, the second electrode layer 331 can function as an electrode layer as well as a reflection layer. In this case, the second electrode layer 331 can be made of a nontransparent conductive material, which has a high reflection at a given wavelength of the input light beam. Alternatively, a separate reflection layer can be formed between the second alignment layer 332 and the second electrode layer 331, or between the second electrode layer 332 and the second substrate 330.

Nematic liquid crystals 310 are disposed between the first and second alignment layers 322 and 332. The first and second electrode layers 321 and 331 are connected to an external voltage source 410. While described as external, it is understood that the voltage can be internal to the control member 112, such as where the member 112 includes a battery and/or voltage is generated internally.

Figure 3C:
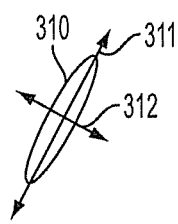
FIG. 3C is an exaggerated view of a liquid crystal having two optic axes according to an embodiment of the present subject matter.

FIG. 3C shows an exaggerated view of a liquid crystal 310 having two optic axes. The liquid crystal 310 has a first refractive index for light oscillating along a first optic axis 311, and a second refractive index for light oscillating along a second optic axis 312. Due to this characteristic, the liquid crystal 310 shows a birefringence, which can be identified by the difference between the first and second refractive indices. For sake of description, the orientation of the liquid crystal 310 is defined as the direction of the first optic axis 311.

In the homeotroic LC cell, liquid crystals 310 are oriented perpendicular to the first and second substrates 320 and 330 in the absence of an external voltage. In other words, the first optic axis 311 of the liquid crystals 310 is aligned perpendicular to the first and second substrates 320 and 330.

FIG. 3A illustrates that a first voltage V1 is applied to the homeotropic LC cell. In the structure shown in FIG. 3A, the first voltage V1 is zero, and the liquid crystals 310 are oriented perpendicular to the substrates 320 and 330. In this state, light traveling from the first substrate 320 to the second substrate 330 experiences no birefringence effect.

FIG. 3B shows that a second voltage V2 is applied to the homeotropic LC cell. If the second voltage V2 is non-zero, the liquid crystals 310 may be tilted in a certain direction at the second voltage V2. In this state, the first optic axis 311 is aligned at a direction that is not perpendicular to the first and second substrates 320 and 330. In this state, light traveling from the first substrate 320 to the second substrate 330 experiences a birefringence effect. The magnitude of the birefringence effect depends on the tilt angle of the first optic axis 311 of the liquid crystals 310.

Since the tilt angle of the liquid crystals 310 changes depending on the magnitude of the voltage applied to the liquid crystals 310, the homeotropic LC cell can be used for the birefringence control member 112 of the VOA 100.

In addition to the homeotropic LC cell as used in an embodiment of the present subject matter as illustrated in FIGS. 3A-3C, it should be appreciated that within the scope of the present subject matter, the homeotropic LC cell can be replaced with an In-Plane Switching (IPS) mode LC cell or a Blue Phase mode LC cell, both of which have zero birefringence when no external voltage/current is applied thereto and have nonzero birefringence when an external voltage/current is applied thereto. By using the homeotropic LC cell, IPS mode LC cell, or Blue Phase mode LC cell in combination with a square or wedge type birefringent crystal, Wollaston prisms, and Brewster windows, for example, it is possible to significantly enhance the stability and accuracy of the VOA and significantly reduce the volume of the VOA.

Although a few embodiments of the present subject matter have been shown and described, it would be appreciated by those skilled in the art that changes may be made in this embodiment without departing from the principles and spirit of the present subject matter, the scope of which is defined in the claims and their equivalents.

What is claimed is:

1. A variable optical attenuator comprising:
a collimating unit that collimates an incident light beam;
a polarization splitting member that separates the collimated light beam into a first polarized light beam having a first polarization and a second polarized light beam having a second polarization;
a birefringence control unit through which the first and second polarized light beams pass, wherein the birefringence control unit includes a liquid crystal cell having a birefringence that is controlled by a voltage or current, wherein the birefringence of the liquid crystal cell is substantially zero when no voltage or current is applied thereto; and
a reflection member that reflects the first and second polarized light beams output from the birefringence control unit.

2. The variable optical attenuator according to claim 1, wherein the liquid crystal cell comprises homeotropic liquid crystal.

3. The variable optical attenuator according to claim 1, wherein the liquid crystal cell is an In-Plane Switching (IPS) mode liquid crystal cell.

4. The variable optical attenuator according to claim 1, wherein the liquid crystal cell is a Blue Phase mode liquid crystal cell.

5. The variable optical attenuator according to claim 1, wherein the polarization splitting member comprises a square type birefringent crystal, wedge type birefringent crystal. Wollaston prisms, and/or Brewster windows.

6. The variable optical attenuator according to claim 1, wherein the collimating unit comprises an optical input channel, an optical output channel, and an optical lens.

7. The variable optical attenuator according to claim 2, wherein the birefringence control unit comprises two substrates substantially parallel to each other and the homeotropic liquid crystal is provided between the two substrates, molecules of the homeotropic liquid crystal being oriented substantially orthogonal to at least one surface of the substrates that contacts with the liquid crystal under no external voltage or current applied thereto, whereby the first and second polarized light beams experience no substantial change of polarization when they pass through the birefringence control unit.

8. The variable optical attenuator according to claim 7, wherein when the voltage or current is nonzero, the molecules of the homeotropic liquid crystal are tilted with respect to their orientation when no external voltage or current is applied thereto, thereby changing the polarizations of the first and second polarized light beams.

9. The variable optical attenuator according to claim 1, wherein the birefringence control unit is configured to function as a quarter-wave plate when the voltage or current reaches a predetermined value.

10. A method of processing an optical signal, comprising:
collimating an incident light beam using a collimator;
separating the collimated light beam into a first polarized light beam having a first polarization and a second polarized light beam having a second polarization using a polarization splitter;
controlling a birefringence of a liquid crystal cell in a birefringence control unit by applying a voltage or current such that the birefringence of the liquid crystal is substantially zero when no external voltage or current is applied to the liquid crystal cell and is nonzero when the external voltage or current is applied to the liquid crystal cell; and
reflecting the first and second polarized light beams output from the birefringence control unit to the birefringence control unit.

11. The method according to claim 10, wherein the liquid crystal cell comprises homeotropic liquid crystal.

12. The method according to claim 10, wherein the liquid crystal cell is an In-Plane Switching (IPS) mode liquid crystal cell.

13. The method according to claim 10, wherein the liquid crystal cell is a Blue Phase mode liquid crystal cell.

14. The method according to claim 10, wherein the polarization splitting member comprises a square type birefringent crystal, wedge type birefringent crystal, Wollaston prisms, and/or Brewster windows.

15. The method according to claim 10, wherein the collimating unit comprises an optical input channel, an optical output channel, and an optical lens.

16. The method according to claim 11, wherein the birefringence control unit comprises two plates substantially parallel to each other and the homeotropic liquid crystal is provided between the two substrates, molecules of the homeotropic liquid crystal being oriented substantially orthogonal to at least one surface of the substrates that contacts with the liquid crystal under no external voltage or current applied thereto, whereby the first and second polarized light beams experience no substantial change of polarization when they pass through the birefringence control unit.

17. The method according to claim 16, wherein when the external voltage or current from the external voltage/current source is nonzero, the molecules of the homeotropic liquid crystal are tilted with respect to their orientation under no external voltage or current applied thereto, thereby changing the polarizations of the first and second polarized light beams.

18. The method according to claim 1, wherein the birefringence control unit is configured to function as a quarter-wave plate when the external voltage or current from the external voltage/current source reaches a predetermined value.

* * * * *